W. H. STEVENS.
SPIKE.
APPLICATION FILED MAY 13, 1911.

1,012,475.

Patented Dec. 19, 1911.

WITNESSES

William H. Stevens INVENTOR

Attorney.

UNITED STATES PATENT OFFICE.

WILLIAM HENRY STEVENS, OF TRENTON, NEW JERSEY, ASSIGNOR OF ONE-HALF TO DICK P. STRYKER, OF SOMERVILLE, NEW JERSEY.

SPIKE.

1,012,475. Specification of Letters Patent. Patented Dec. 19, 1911.

Application filed May 13, 1911. Serial No. 626,898.

*To all whom it may concern:*

Be it known that I, WILLIAM H. STEVENS, a citizen of the United States, residing at Trenton, in the county of Mercer and State of New Jersey, have invented certain new and useful Improvements in Spikes, of which the following is a specification, reference being had therein to the accompanying drawing.

This invention relates to spikes and the principal object of the same is to provide the spike with teeth which are pivotally mounted and which will automatically open when it is attempted to withdraw the spike thus preventing the withdrawal thereof.

This invention is illustrated in the accompanying drawings, wherein:—

Figure 1:
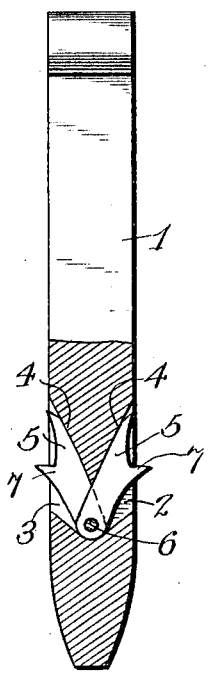
Figure 2:
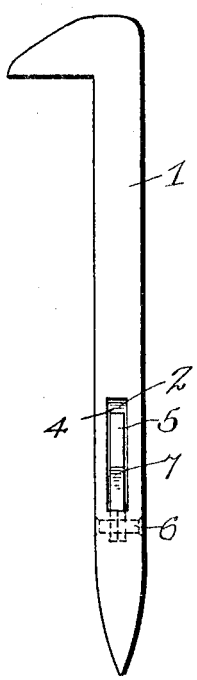
Figure 3:
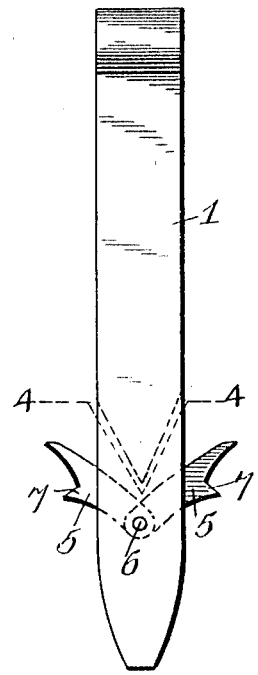
Figure 4:
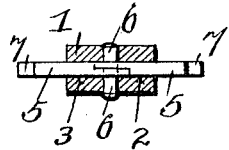
Figure 5:
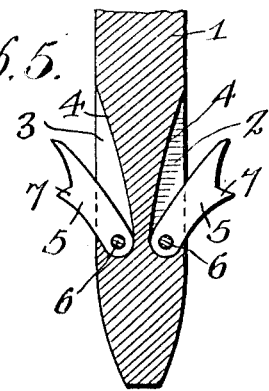

Figure 1 is a view of the spike in front elevation, the lower portion being shown in section: showing the teeth in a folded position. Fig. 2 is a view in side elevation. Fig. 3 is a view in front elevation with the teeth extended. Fig. 4 is a view in cross section along the line 4—4, in Fig. 3. Fig. 5 is a sectional view of the lower portion of the spike and shows a modified manner of mounting the teeth.

Referring to the accompanying drawings by numerals it will be seen that this invention comprises a spike 1, which is of the type generally used with railroad ties, or for securing large joists in place. The lower portion of the spike is provided with communicating openings 2 and 3 which are formed through the sides and which have sloping inner faces 4. Teeth 5 are placed in the openings 2 and 3 and have their inner ends pivotally mounted upon a pin 6. The teeth are of such dimensions that when folded as shown in Fig. 1 they will be positioned entirely within the openings 2 and 3 with the exception of the spurs 7 which extend beyond the openings. From an inspection of Fig. 4 it will be noted that the inner portions of the teeth are reduced so that they will fit closely together and will therefore, not have any transverse movement upon the pin 6.

In Fig. 5 I have shown a slightly modified form of spike in which the openings 2 and 3 do not communicate and in which the teeth 5 are provided with independent pivot pins. The operation of this modified form is exactly similar to that of the preferred form.

In use, this spike is driven into the tie, the spurs 7 being at such an angle to permit the spike to very readily enter the tie. If it is attempted to remove the spike the spurs 7 engage the wood and upon the spike being drawn out a greater degree open outwardly and prevent the spike from being withdrawn. It will thus be noted that the action of these teeth is automatic.

What I claim as my invention is:—

A spike provided with seats leading from opposite faces and communicating at their lower portions, teeth positioned within said seats and having their inner ends reduced and overlapped, a pivot pin passing through the inner ends of said teeth to pivotally mount the same, and spurs formed upon said teeth and positioned outside said seats when said teeth are in a folded position.

In testimony whereof I hereunto affix my signature in presence of two witnesses.

WILLIAM HENRY STEVENS.

Witnesses:
 THOMAS B. MADDEN,
 JNO. CASPER.